United States Patent
Bachu et al.

(10) Patent No.: US 9,424,056 B1
(45) Date of Patent: Aug. 23, 2016

(54) CROSS SITE RECOVERY OF A VM

(71) Applicant: EMC Corporation, Hopkinton, MA (US)

(72) Inventors: Kiran K. Bachu, Cupertino, CA (US); Richard Meier, Campbell, CA (US); Vijay C. Madhavapeddi, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 290 days.

(21) Appl. No.: 13/931,422

(22) Filed: Jun. 28, 2013

(51) Int. Cl.
G06F 9/455 (2006.01)
G06F 7/00 (2006.01)
G06F 11/00 (2006.01)
G06F 11/14 (2006.01)

(52) U.S. Cl.
CPC ........ G06F 9/45533 (2013.01); G06F 11/1446 (2013.01)

(58) Field of Classification Search
None
See application file for complete search history.

(56) References Cited

U.S. PATENT DOCUMENTS

| 7,139,748 | B1 |  | 11/2006 | Mills et al. |  |
|---|---|---|---|---|---|
| 8,135,930 | B1 |  | 3/2012 | Mattox et al. |  |
| 8,151,263 | B1 | * | 4/2012 | Venkitachalam et al. | 718/1 |
| 8,261,282 | B1 | * | 9/2012 | Ponnapur et al. | 718/105 |
| 8,281,093 | B1 | * | 10/2012 | Krishnan et al. | 711/162 |
| 8,819,369 | B1 | * | 8/2014 | Alappat et al. | 711/162 |
| 8,850,146 | B1 | * | 9/2014 | Majumdar | 711/162 |
| 2005/0125513 | A1 |  | 6/2005 | Lam et al. |  |
| 2008/0016387 | A1 | * | 1/2008 | Bensinger | G06F 11/1451 714/4.11 |
| 2009/0132616 | A1 |  | 5/2009 | Winter et al. |  |
| 2009/0276591 | A1 |  | 11/2009 | Mu et al. |  |
| 2009/0313447 | A1 |  | 12/2009 | Nguyen et al. |  |
| 2010/0011238 | A1 | * | 1/2010 | Nakamura et al. | 714/5 |
| 2010/0299666 | A1 | * | 11/2010 | Agbaria et al. | 718/1 |
| 2011/0087874 | A1 | * | 4/2011 | Timashev et al. | 713/100 |
| 2012/0072685 | A1 | * | 3/2012 | Otani | 711/162 |
| 2012/0084262 | A1 |  | 4/2012 | Dwarampudi et al. |  |
| 2012/0144229 | A1 | * | 6/2012 | Nadolski | 714/4.2 |
| 2012/0233282 | A1 |  | 9/2012 | Voccio et al. |  |
| 2012/0311580 | A1 | * | 12/2012 | Emelianov et al. | 718/100 |
| 2013/0014103 | A1 | * | 1/2013 | Reuther et al. | 718/1 |
| 2013/0159650 | A1 | * | 6/2013 | Wakamiya | 711/162 |
| 2013/0238867 | A1 | * | 9/2013 | Hayashi | 711/162 |
| 2014/0059375 | A1 | * | 2/2014 | McElhoe et al. | 714/4.1 |
| 2014/0059539 | A1 | * | 2/2014 | Simonsen et al. | 718/1 |
| 2014/0095816 | A1 | * | 4/2014 | Hsu et al. | 711/162 |
| 2014/0130040 | A1 | * | 5/2014 | Lemanski | G06F 9/4856 718/1 |
| 2014/0181813 | A1 | * | 6/2014 | Deshpande et al. | 718/1 |

OTHER PUBLICATIONS

U.S. Appl. No. 13/729,249, filed Dec. 28, 2012.
U.S. Appl. No. 13/886,897, filed May 5, 2013.

* cited by examiner

Primary Examiner — Adam Lee
(74) Attorney, Agent, or Firm — Van Pelt, Yi & James LLP

(57) ABSTRACT

Restoring a virtual machine is disclosed. An indication of the virtual machine of a primary site to be restored at a remote site using a copy stored at the remote site of a backup data of the virtual machine of the primary site is received. The virtual machine is restored to the remote site using a backup application deployed at the remote site as a virtual appliance managed using a virtual environment management platform.

19 Claims, 3 Drawing Sheets

CROSS SITE RECOVERY OF A VM

BACKGROUND OF THE INVENTION

Virtualization and virtual machines enable software emulation of hardware devices and components. Data of a virtual machine may be backed up to a backup storage. For example, data contents and configuration of an operating system and/or application running on a virtual machine may be stored as a backup to enable recovery of the virtual machine in the event the virtual machine fails and needs to be restored. Although the backed up data of the virtual machine may be used to restore the virtual machine, traditionally the restoration of the virtual machine requires a considerable amount of effort and time from a system administrator. Therefore, there exists a need for a more efficient and dynamic way to restore a virtual machine from a backup.

BRIEF DESCRIPTION OF THE DRAWINGS

Various embodiments of the invention are disclosed in the following detailed description and the accompanying drawings.

DETAILED DESCRIPTION

Figure 1:
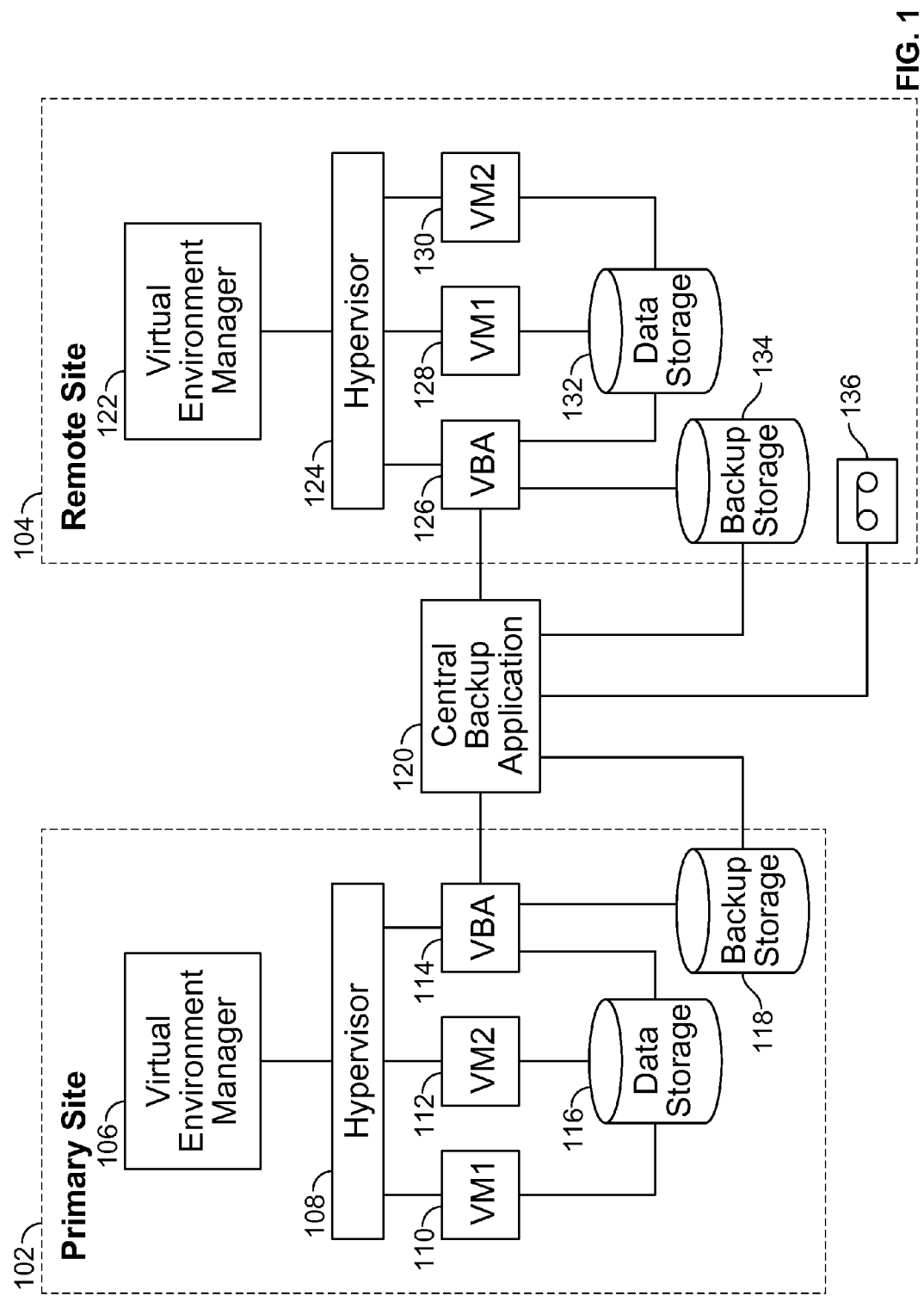
FIG. 1 is a block diagram illustrating an embodiment of a virtual computing and backup environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restoring a virtual machine is disclosed. In some embodiments, a virtual machine of a primary site is to be restored at a remote site using a copy stored at the remote site of a backup data of the virtual machine of the primary site. For example, the primary site may become disabled (e.g., due to a natural disaster destroying servers of the primary site) or overwhelmed (e.g., server overload) and it is desired to recreate the virtual computing environment of the primary site at the remote site to offer services of the primary site at the remote site. A backup copy of the virtual machine to be restored may have been stored at a backup storage of the primary site and mirrored/replicated to a backup storage of the remote site. The virtual machine is restored to the remote site using a backup application deployed at the remote site as a virtual appliance managed using a virtual environment management platform. For example, a virtual computing environment is initiated at the remote site and a virtual backup appliance is deployed in the virtual computing environment. The virtual backup appliance may access the backup storage at the remote site to deploy the virtual machine to be restored/replicated.

FIG. 1 is a block diagram illustrating an embodiment of a virtual computing and backup environment. Primary site 102 includes a first virtual environment and remote site 104 includes a second virtual environment. In some embodiments, remote site 104 is associated with a physically different hardware and/or physical location. For example, in the event of a disaster that destroys servers located at a location of the primary site, servers located at the remote site may be used as a backup. In some embodiments, remote site 104 stores a backup data that is a backup of data stored at primary site 102. A first group of computing machines and storage may be associated with the primary site and a second group of computing machines and storage may be associated with the remote site. In some embodiments, remote site 104 may be able to offer services that are offered by the primary site. For example, remote site 104 provides services to a first group of users (e.g., users of a first geographic location) and primary site 102 provides the same services to a second group of users (e.g., users of a second geographic location) using virtual machines replicated from the primary site. In another example, remote site 104 is configured to offer services of primary site 102 in the event primary site 102 is overloaded and/or becomes unavailable.

Primary site 102 includes virtual environment manager 106. In some embodiments, virtual environment manager 106 manages a virtual computing environment. For example, virtual environment manager 106 offers a virtual computing environment management platform that can be used to view, configure, deploy, operate, modify, and/or backup a virtual computing environment. A user interface may be offered by virtual environment manager 106 to allow a user to manage the virtual computing environment. The virtual computing environment includes one or more virtual machines. An example of virtual environment manager 106 includes VMware vCenter™ offered by VMware, Inc. of Palo Alto, Calif. Virtual environment manager 106 is connected to hypervisor 108. Hypervisor 108 creates and operates VM (i.e., virtual machine) 110, VM 112, and virtual backup appliance 114. In some embodiments, hypervisor 108 includes an enterprise hypervisor for virtual servers that execute directly on host server hardware without requiring an additional underlying operating system. An example of hypervisor 108 includes VMware ESX and VMware ESXi of VMware, Inc. VM 110, VM 112, and VBA 114 may include a software-implemented abstraction of a hardware. For example, VM 110 and VM 112 each emulates a computer with its own operating system and application. VM 110 and VM 112 may each host a user application/service and/or a server application/service.

VBA 114 is a virtual backup appliance that performs data protection and/or backup of one or more components of the virtual computing environment of primary site 102. For example, VBA 114 performs backup of VM 110 and VM 112 to backup storage 118. In some embodiments, VBA 114 includes VMware Backup Appliance. In some embodiments, VBA 114 allows native format (e.g., image-based) backup and restore of virtual machines/components. Data storage 116 includes data of VM 110, VM 112, and/or VBA 114. For example, configuration data, operating data, production data, and/or implementation data of VM 110, VM 112 and/or VBA 114 may be stored in data storage 116. In some embodiments, in order to backup a virtual machine such as VM 110, VBA 114 learns about the existence and storage location of the virtual machine using virtual environment manager 106, hypervisor 108 and/or directly from VM 110, and directly accesses the data of the virtual machine to be backed up from data storage 116 to store the backup data to backup storage 118. In some embodiments, VBA 114 is deployed in the virtual computing environment of primary site 102. For example, VBA 114 is installed/deployed and managed using the virtual environment management platform of virtual environment manager 106. Data to be backed up using VBA 114 may be specified using a user interface of virtual environment manager 106 that controls VBA 114. VBA 114 stores backup data to backup storage 118. Backup storage 118 may perform deduplication of stored data. An example of backup storage 118 includes EMC Data Domain® Deduplication storage and/or replicator of EMC Corporation of Hopkinton, Mass. VBA 114 may store backup data to other storage locations (e.g., database, tape, etc.).

In some embodiments, central backup application 120 manages data protection, recovery, and/or backup across one or more sites, virtual environments, IT environments, and/or data storage locations/devices. An example of central backup application 120 includes EMC NetWorker™ of EMC Corporation. In some embodiments, EMC NetWorker is a suite of enterprise level data protection software that unifies and automates backup to tape, disk-based, and flash-based storage media across physical and virtual environments for granular and disaster recovery. Cross-platform support is provided for many operating system environments and file systems. EMC NetWorker may manage data zones that contain clients/data to be backed up. The NetWorker management console may provide a graphic user interface for functions such as client configuration, policy settings, schedules, monitoring, reports, and daily operations for de-duplicated and non-de-duplicated backups.

In some embodiments, central backup application 120 provides VBA 114 with one or more data protection policies. For example, VBA 114 may be deployed as a module that communicates and coordinates with central backup application 120 to allow a data protection administrator using central backup application 120 to access, monitor and control any number of VBAs. For example, a data protection policy may be provided to VBA 114 by central backup application 120 to allow a network administrator of primary site 102 to utilize the policy to backup data of primary site 102. A data protection policy may specify one or more of the following: how data is to be backed up, when a backup is to be performed, where and type of storage the backup data is to be stored, a retention period of the backup data, where the backup data is to be replicated, a retention period(s) of replicated backup data, or which data is to be backed up. Central backup application 120 may be a part of primary site 102, remote site 104, and/or another site. Central backup application 120 may be hosted on a physical server and/or a virtual machine/appliance. Central backup application 120 may manage data protection of a plurality of sites and IT environments. In some embodiments, central backup application 120 manages replication of backup data stored in backup storage 118. For example, according to a backup policy, central backup application 120 manages/facilitates replication of at least a selected portion of contents of backup storage 118 to backup storage 134 and/or media (e.g., backup tape) storage 136 located at remote site 104. Backup storage 134 may perform deduplication of stored data. An example of backup storage 134 includes EMC Data Domain Deduplication storage and/or replicator of EMC Corporation.

In the event one or more virtual machines of primary site 102 are desired to be replicated to remote site 104, central backup application 120 may instruct VBA 126 to replicate and deploy the virtual machine(s) using replicated backup data stored at backup storage 134 and/or media storage 136. For example, hypervisor 124 and virtual environment manager 122 are installed, deployed, and/or initialized and VBA 126 is deployed in the virtual computing environment and virtual environment management platform of manager 122 and hypervisor 124. An example of virtual environment manager 122 includes VMware vCenter offered by VMware, Inc. In some embodiments, hypervisor 124 includes an enterprise hypervisor for virtual servers that execute directly on host server hardware without requiring an additional underlying operating system. An example of hypervisor 124 includes VMware ESX and VMware ESXi of VMware, Inc. VBA 126 is a virtual backup appliance that performs data protection and/or restoration of one or more components of the virtual computing environment of remote site 104. In some embodiments, VBA 126 allows native format (e.g., image-based) backup and restore of virtual machines/components. VBA 126 is installed/deployed and managed using the virtual environment management platform of virtual environment manager 122. An example of backup storage 134 includes EMC Data Domain Deduplication storage and/or replicator of EMC Corporation.

VBA 126 communicates with central backup application 120 to perform data protection management functions. Using backup data stored at storage 134 and/or backup media 136, VBA 126 initializes/deploys virtual machines to be replicated at the remote site. In the example shown in FIG. 1, VM 110 has been replicated as VM 128 and VM 112 has been replicated at VM 130. An example of replicating the virtual machine includes storing at data storage 132 an image of the virtual machine to be replicated/reconstructed using backup data stored at storage 134 and/or 136. Then VBA 126 may initialize and deploy the replicated virtual machine by registering the image as a new virtual machine to virtual environment manager 122 and/or hypervisor 124. Data storage 132 includes data of VM 128, VM 130, and/or VBA 126. For example, configuration data, operating data, production data, and/or implementation data of VM 128, VM 130, and/or VBA 126 may be stored in data storage 132.

The components shown in FIG. 1 may be implemented in one or more computers, servers, storage devices, networking components, and/or virtual components/networks. Connection between the components may include one or more of the following: a direct or indirect physical communication connection, mobile communication network, Internet, intranet, Local Area Network, Wide Area Network, Storage Area Network, and any other form of connecting two or more systems, components, or storage devices together. For example, primary site 102, central backup application 120, and remote site 104 may be connected together via a Wide Area Network. Other communication paths may exist and the example of FIG. 1 has been simplified to illustrate the example clearly. Although single instances of components have been shown to simplify the diagram, additional instances of any of the components shown in FIG. 1 may exist. For example, other instances of virtual machines, data stores, backup storages, VBAs, hypervisors, virtual environment managers, and central backup applications may exist. Components not shown in FIG. 1 may also exist.

Figure 2:
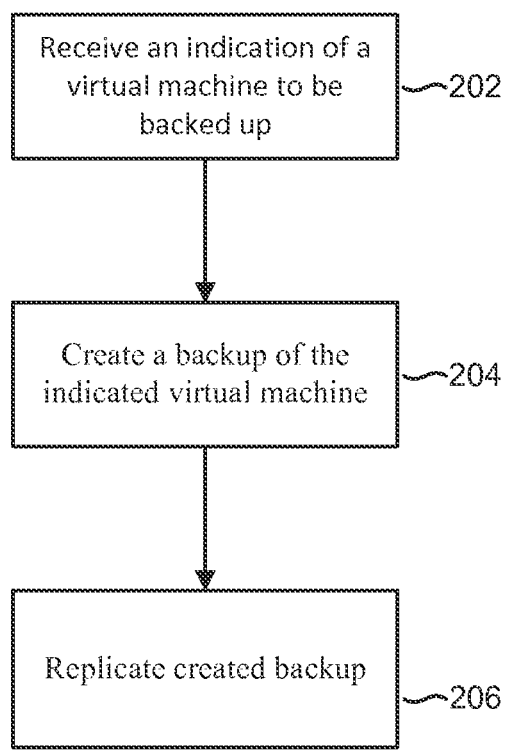
FIG. 2 is a flowchart illustrating an embodiment of a process for creating a backup of a virtual machine.

FIG. 2 is a flowchart illustrating an embodiment of a process for creating a backup of a virtual machine. In some embodiments, at least a portion of the process of FIG. 2 is implemented on central backup application 120 and/or VBA 114 of FIG. 1. In some embodiments, the process of FIG. 2 is performed periodically. For example, a data/virtual machine (VM) to be protected is periodically backed up based on a periodic interval determined based on a policy. The data protection policy for a particular data/VM to be backed up may be specified by a user/administrator for a particular data/VM (e.g., using a user interface of virtual environment manager 106 of FIG. 1) and/or at least in part by a backup application such as central backup application 120 of FIG. 1. In some embodiments, at least a portion of the process of FIG. 2 is performed dynamically. For example, the process of FIG. 2 is performed when a dynamic determination (e.g., based on detection of change to data to be backed up since last backup) is made that a backup should be performed.

At 202, an indication of a virtual machine to be backed up is received. In some embodiments, the indication is received via a user interface provided using virtual environment manager 106 of FIG. 1. For example, the indication is received via EMC Backup and Recovery User Interface of VMware vCenter. In some embodiments, the user interface allows a user/administrator to view VMs and virtual environment resources and devices in a hierarchical format (e.g., tree organization) and the user/administrator may graphically explore the hierarchical format to indicate the VM(s)/resources to be backed up. In some embodiments, the indication is associated with a data protection policy. In some embodiments, a selected policy among a plurality of data protection policies (e.g., among received policies from a central backup application such as central backup application 120 of FIG. 1) is selected for the data/VM to be backed up. For example, an administrator selects a selected policy (e.g., platinum policy) among types of available policies (e.g., silver policy—backup to local backup storage only, gold policy—backup to local backup storage and replicate backup to remote storage, platinum policy—backup to local backup storage and replicate to remote backup storage and tape backup) for the specified VM to be backed up. The indication may specify which data/VM to backup, which storage type(s)/locations to store the created backup, type of backup to be performed, when to perform the backup, a retention period of the backup data, where the backup data is to be replicated, a retention period(s) of replicated backup data, and/or any other indication associated with a data protection policy and/or performing a backup.

At 204, a backup of the indicated VM is created. In some embodiments, creating the backup includes storing at least a portion of data of the VM in a backup storage. In some embodiments, creating the backup includes storing an image of the VM in a backup storage (e.g., performing image-based backup). For example, although the existence and/or data storage location of the VM being backed up may be obtained via a virtual environment manager, hypervisor, and/or directly from the VM, an image of the VM is created from a data storage of the VM (e.g., image of VM 110 is created from data of VM 110 stored in data storage 116 of FIG. 1) without analyzing the contents of the VM (e.g., agent running inside VM is not used and/or contents of the VM is not received from the VM for backup) and the image is stored in a backup storage such as backup storage 118 of FIG. 1. In some embodiments, creating the backup includes storing a file of the VM in a backup storage (e.g., performing file-based backup). In some embodiments, creating the backup includes backing up the entire VM. In an alternative embodiment, only a portion of the VM is backed up. In some embodiments, creating the backup includes storing a backup of the VM in a native format of the VM.

In some embodiments, the backup is created by a VBA such as VBA 114 of FIG. 1. In some embodiments, by directly accessing data of a VM to be backed up from a data storage of the VM rather than via the VM, backup may be performed more efficiently with less processing required by the VM. In an alternative embodiment, creating the backup includes receiving content to be backed up from the VM. For example, guest space backup is performed by an agent running in the VM that provides content/files to be backed up. In some embodiments, creating the backup includes creating the backup according to the data protection policy associated with the VM to be backed up. For example, type(s) of backup storage(s) to be utilized, retention period of the backup data, whether to replicate the backup data to a remote site, retention period of the replicated backup, and/or frequency of the backup may be specified by an associated policy and the policy is followed when creating the backup.

In some embodiments, creating the backup includes communicating with a central backup application 120 regarding the backup performed. For example, VBA 114 performs a backup of VM 110, and VBA 114 informs central backup application 120 regarding the backup (e.g., identification of content backed up, time/version of the backup, location of the backup, etc.) to allow central backup application 120 of FIG. 1 update its catalog/metadata of existing backup data. VBA 114 may maintain a local catalog/metadata of existing backup data (e.g., updated when backup is performed) and central backup application 120 may also maintain its own version of the catalog/metadata that is synchronized with the local catalog/metadata using indications provided by VBA 114 of FIG. 1. In some embodiments, the created backup is identified as a backup data of a primary site. In some embodiments, the created backup may be stored at multiple backup storage locations.

At 206, the created backup is replicated. In some embodiments, step 206 is optional and performed if the backed up VM is associated with a data protection policy that indicates the backup of the VM should be replicated. In some embodiments, replicating the backup includes storing at least a portion of the created backup in a secondary backup storage. The secondary backup storage may be located at a remote site such as remote site 104 of FIG. 1. In some embodiments, replication of the backup is performed by a central backup application (e.g., central backup application 120) by accessing backup storage directly from the source backup storage (e.g., backup storage 118) to replicate the backup data to another backup storage (e.g., backup storage 134 and/or media storage 136 of FIG. 1). Performing the replication may include de-duplicating the backup (e.g., replicating only the portion of the backup that changed from a prior stored backup). In some embodiments, the replicating the backup includes replicating the backup to a plurality of other storage locations (e.g., to both backup storage 134 and media backup system 136 of FIG. 1). In some embodiments, the replicated backup data is identified as a replicated copy.

Figure 3:
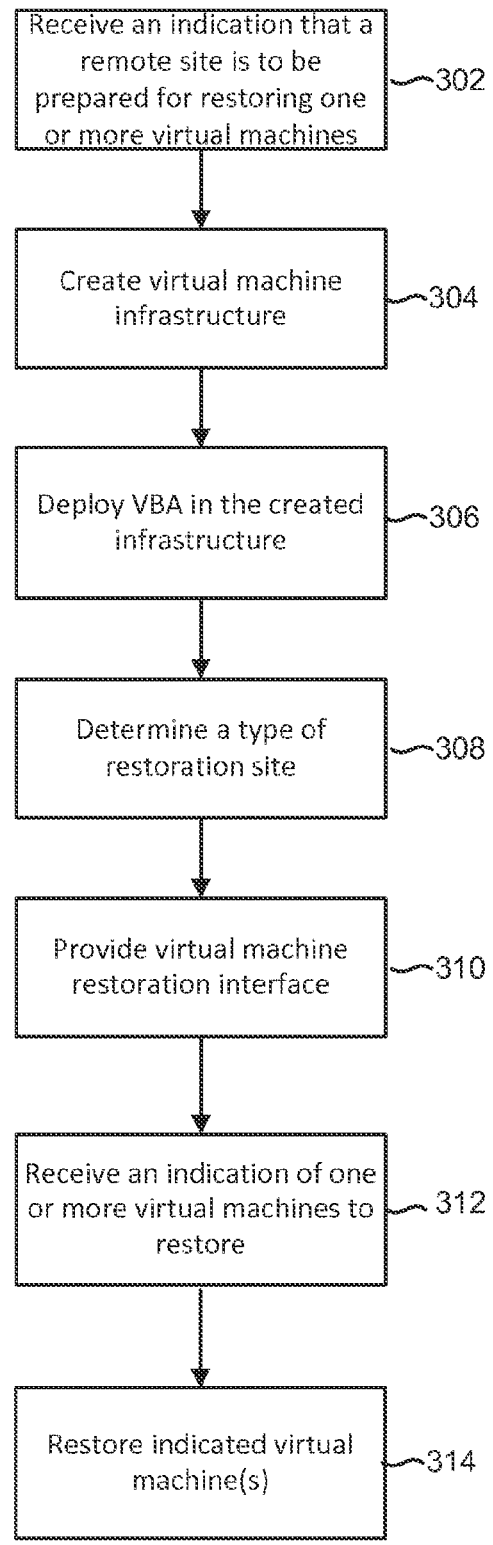
FIG. 3 is a flowchart illustrating an embodiment of a process for restoring a virtual machine.

FIG. 3 is a flowchart illustrating an embodiment of a process for restoring a virtual machine. In some embodiments, the process of FIG. 3 is implemented at least in part by central backup application 120 and/or VBA 126 of FIG. 1.

At 302, an indication is received that a remote site is to be prepared for restoring one or more VMs. In some embodiments, the indication may be received manually from a user/administrator. For example, IT/system setup of a primary site is desired to be replicated from another site. In some embodiments, the indication may be automatically received when it is detected that a primary site has encountered an error. For example, it is detected that the primary site is down (i.e., not functional) and a remote site should take over at least a portion of a functionality of the primary site. In another example, it is detected that a primary is overloaded (e.g., resource utilization is above a threshold) and a remote site is indicated to assist in handling processing (e.g., offload processing) of the primary site. In some embodiments, the indication is provided by a central backup application such as central backup application 120 of FIG. 1.

At 304, a VM infrastructure is created. In some embodiments, step 304 is optional because the VM infrastructure already exists at a remote site. In some embodiments, creating the VM infrastructure includes installing, deploying, and/or initializing a hypervisor (e.g., hypervisor 124) and virtual environment manager (e.g., virtual environment manager 122) at a remote site. An example of the virtual environment manager includes VMware vCenter offered by VMware, Inc. An example of the hypervisor includes VMware ESX and VMware ESXi of VMware, Inc.

At 306, a VBA is deployed in the created VM infrastructure. In some embodiments, deploying the VBA includes starting, installing, and/or initializing the VBA in the virtual environment management platform of the VM infrastructure. For example, VBA 126 is deployed in the platform of virtual environment manager 122 of FIG. 1. In some embodiments, the VBA initializes with a central backup application (e.g., application 120 of FIG. 1). The VBA may access contents of a backup storage (e.g., backup storage 134 of FIG. 1) of the remote site and determine available VM/content to be restored. In some embodiments, accessing the contents includes accessing contents from a backup media storage (e.g., storage 136 of FIG. 1).

At 308, a type of restoration site is determined. In some embodiments, determining the type of restoration site includes determining whether the remote site being restored should be set as a primary site. For example, in the event a primary site has encountered an error, a remote site is configured to become a primary site (e.g., hostname of remote site set to be the same as the primary site) and in the event a primary site is still functioning, a remote site is configured to remain a secondary site (e.g., hostname of remote site set to be different from the primary site). In some embodiments, determining the type of restoration site includes determining a hostname of the remote site.

At 310, a VM restoration interface is provided. In some embodiments, providing the restoration interface includes providing an interface via a virtual environment manager (e.g., manager 122 of FIG. 1) that enables a user/administrator to select which VM/component to restore. In some embodiments, the restoration interface includes the EMC Backup and Recovery User Interface provided via VMware vCenter. In some embodiments, the user interface allows a user/administrator to view VMs and virtual environment resources and devices that are able to be restored (e.g., determined by a VBA that analyzed a backup storage that includes data that can be used to restore virtual computing environment components) in a hierarchical format (e.g., tree organization) and the user/administrator may graphically explore the hierarchical format to indicate the VM(s)/resources to be restored. In some embodiments, VM(s)/resource(s) that can be restored may be configured to be only shown to be restored to an originating primary site (e.g., because backup data was created at the primary site) and in the event the site to be restored to the VM(s) is not typed as a primary site at 308, the VM(s)/resource(s) that can be restored are configured to be shown to be able to be restored to the remote site. In some embodiments, the utilization of the restoration interface is optional. For example, all VM(s)/resources that are able to be restored are all indicated to be restored and/or VM(s)/resources to be restored are automatically determined.

At 312, an indication of one or more VMs to restore is received. In some embodiments, the indication is received via the provided interface of 310. In some embodiments, the indication is received from a user/administrator. In some embodiments, the indication was automatically determined. In some embodiments, the indication indicates to restore all available VM(s)/resource(s) stored at a backup storage of the remote site being restored.

At 314, the indicated VM(s) are restored. In some embodiments, restoring the VM(s) includes deploying the VMs at the remote site. For example, the deployed VBA at least in part initializes/deploys VMs to be restored/replicated at the remote site. In some embodiments, replicating the VM includes reconstructing an image of the VM to be replicated using backup data (e.g., stored at backup storage 134 of FIG. 1), storing the image at a production data storage (e.g., data storage 132 of FIG. 1), and deploying the VM by registering the image as a new VM to the virtual environment management platform and/or hypervisor of the virtual environment. In some embodiments, restoring the indicated VM(s) includes restoring data in a native format of the VM(s) being restored. In some embodiments, restoring the VM(s) includes providing an image and/or package to a virtual environment manager to deploy the VM in the virtual environment management platform of the virtual environment manager.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for restoring a virtual machine, comprising:
a communication interface configured to receive an indication that a virtual machine of a primary site is to be restored at a remote site using a copy of a backup data of the virtual machine of the primary site, wherein the backup data was generated using a primary site virtual appliance of the primary site directly accessing data of the virtual machine of the primary site from a storage of the primary site, wherein the copy of the backup data is stored at the remote site and was replicated to the remote site pursuant to a data protection policy of a central backup application of the system, wherein the central backup application manages data protection of a plurality of computing environments; and
a processor coupled with the communication interface and configured to restore the virtual machine of the primary site at the remote site using a backup application deployed at the remote site as a virtual appliance managed using a virtual environment management platform, wherein in response to receiving a communication from the central backup application, the backup application deployed at the remote site is configured to restore the virtual machine of the primary site at the remote site using the copy of the backup data of the virtual machine of the primary site that is stored at the remote site, wherein the copy of the backup data was indicated to be replicated to a remote backup storage of the remote site from a primary backup storage of the primary site.

2. The system of claim 1, wherein the primary site and the remote site are associated with different geographical locations.

3. The system of claim 1, wherein the indication is associated with a determination that the primary site has encountered an error.

4. The system of claim 1, wherein the indication is associated with a determination that the remote site is to provide at least a portion of a functionality of the primary site.

5. The system of claim 1, wherein the indication is associated with a determination that a utilization level of a resource of the primary site is above a threshold.

6. The system of claim 1, wherein the processor is further configured to create a virtual machine infrastructure of the virtual environment management platform.

7. The system of claim 1, wherein the processor is further configured to install a virtual environment manager providing the virtual environment management platform.

8. The system of claim 1, wherein the virtual environment management platform includes VMware vCenter.

9. The system of claim 1, wherein the processor is further configured to determine a hostname of the remote site based at least in part on whether the remote site is to become the primary site.

10. The system of claim 1, wherein the processor is further configured to set a hostname of the remote site to be the same as a hostname of the primary site.

11. The system of claim 1, wherein the virtual environment management platform is used at least in part to provide an interface that can be used by a user to select that the virtual machine should be restored to the remote site.

12. The system of claim 1, wherein restoring the virtual machine includes reconstructing an image of the virtual machine using the copy of the backup data.

13. The system of claim 12, wherein restoring the virtual machine includes storing the image to a production data storage of the remote site.

14. The system of claim 13, wherein restoring the virtual machine includes registering the image as a new VM to the virtual environment management platform.

15. The system of claim 1, wherein the copy of the backup data is stored in a native format of the virtual machine.

16. A method for restoring a virtual machine, comprising:
receiving an indication that a virtual machine of a primary site is to be restored at a remote site using a copy of a backup data of the virtual machine of the primary site, wherein the backup data was generated using a primary site virtual appliance of the primary site directly accessing data of the virtual machine from a storage of the primary site, wherein the copy of the backup data is stored at the remote site and was replicated to the remote site pursuant to a data protection policy of a central backup application of the system managing data protection of a plurality of computing environments; and
restoring the virtual machine of the primary site at the remote site using a backup application deployed at the remote site as a virtual appliance managed using a virtual environment management platform, wherein in response to receiving a communication from the central backup application, the backup application deployed at the remote site is configured to restore the virtual machine of the primary site at the remote site using the copy of the backup data of the virtual machine of the primary site that is stored at the remote site, wherein the copy of the backup data was indicated to be replicated to a remote backup storage of the remote site from a primary backup storage of the primary site.

17. The method of claim 16, wherein restoring the virtual machine includes reconstructing an image of the virtual machine using the copy of the backup data.

18. The method of claim 17, wherein restoring the virtual machine includes storing the image to a production data storage of the remote site.

19. A computer program product for restoring a virtual machine, the computer program product being embodied in a non-transitory computer readable storage medium and comprising computer instructions for:
receiving an indication that a virtual machine of a primary site is to be restored at a remote site using a copy of a backup data of the virtual machine of the primary site, wherein the backup data was generated using a primary site virtual appliance of the primary site directly accessing data of the virtual machine of the primary site from a storage of the primary site, wherein the copy of the backup data is stored at the remote site and was replicated to the remote site pursuant to a data protection policy of a central backup application of the system, wherein the central backup application manages data protection of a plurality of computing environments; and
restoring the virtual machine of the primary site at the remote site using a backup application deployed at the remote site as a virtual appliance managed using a virtual environment management platform, wherein in response to receiving a communication from the central backup application, the backup application deployed at the remote site is configured to restore the virtual machine of the primary site at the remote site using the copy of the backup data of the virtual machine of the primary site that is stored at the remote site, wherein the copy of the backup data was indicated to be replicated to a remote backup storage of the remote site from a primary backup storage of the primary site.

* * * * *